W. TUNSTILL.
Saw-Sets.

No. 135,867.

Patented Feb. 11, 1873.

Witnesses
Chas. H. Smith
Geo. D. Walker

Inventor
William Tunstill
Lemuel W. Serrell
atty.

UNITED STATES PATENT OFFICE.

WILLIAM TUNSTILL, OF BROOKLYN, E. D., NEW YORK.

IMPROVEMENT IN SAW-SETS.

Specification forming part of Letters Patent No. 135,867, dated February 11, 1873.

*To all whom it may concern:*

Be it known that I, WILLIAM TUNSTILL, of Brooklyn, E. D., in the county of Kings and State of New York, have invented an Improvement in Saw-Sets, of which the following is a specification:

This saw-set is made of two wheels, with peripheral dies formed of inclined planes placed at alternate inclinations to the axes of the wheels, and each incline occupies a space corresponding to the pitch of the saw-teeth; thereby the saw is set by bending the teeth in alternate opposite directions in the act of passing the blade through between the peripheral dies on such wheels. There are cylindrical guiding and steadying wheels for the saw-blade adjacent to the bending-wheels, and the bending-wheels may be changeable to suit different sizes of saws.

Figure 1:
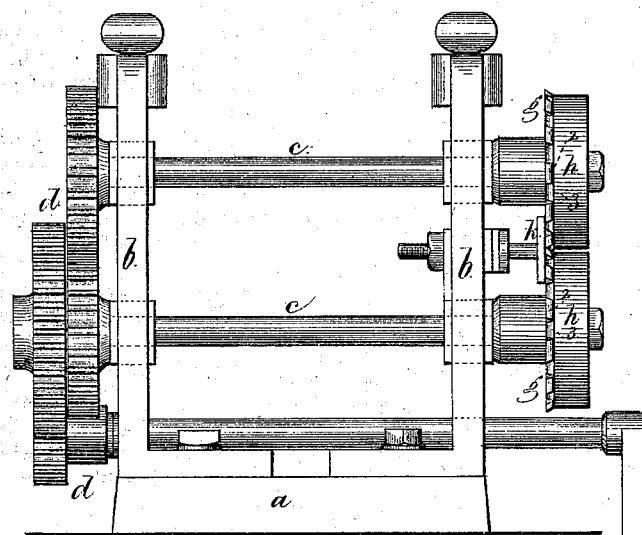
Figure 2:
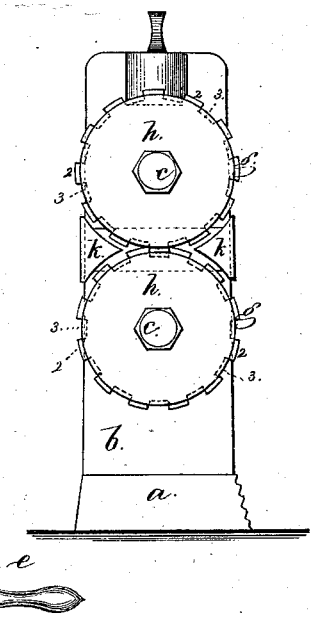

In the drawing, Figure 1 is a side elevation of the saw-setting mechanism, and Fig. 2 is an elevation of the bending-wheels detached.

The bed $a$, standards $b$, shafts $c\ c$, gearing $d$, and actuating-crank $e$ are of any suitable character for giving motion to the bending-wheels $g\ g$ and steadying-wheels $h\ h$. The peripheral dies around the wheels $g$ are planes, at an angle to the axes $c$, and alternating in opposite directions. The incline 2 slopes one way, and the next incline 3 slopes the other way; and these wheels $g\ g$ are positioned and geared together, so that the inclined dies 2 2 serve to bend one tooth of the saw up in one direction, and the inclines 3 3 serve to bend the next tooth of the saw down in the other direction, thereby setting the teeth of the saw with uniformity as said saw is drawn through the machine by the act of revolving the wheels $g\ g$. It is to be understood that the width of the inclines corresponds to the pitch of the saw or distance from one tooth to the next. A gage, $k$, that is adjustable, determines the distance that the saw-teeth pass in between the peripheral bending-dies, and this distance will be varied according to the character of the saw-tooth.

If desired, the saw may be guided by pins set in one of the wheels $h$, that enter the slot between the teeth, and act like a gear-wheel and toothed rack in moving the saw along and presenting the teeth to the bending-dies.

I am aware that a revolving saw-set has been made for operating upon alternate teeth and setting the same by passing the saw twice through the set. In this case projections on one cylinder act upon alternate teeth to bend them against the conical end of the guide-roller. In other instances projections have been employed upon wheels, but without guide-wheels to sustain the saw-blade. I do not claim any such devices.

I claim as my invention—

Peripheral dies, made by inclined planes in alternate opposite directions around the edges of a pair of wheels, substantially as set forth, in combination with the guide-wheels $h\ h$, as set forth.

Signed by me this 6th day of December, A. D. 1872.

WILLIAM TUNSTILL.

Witnesses:
GEO. T. PINCKNEY,
CHAS. H. SMITH.